United States Patent
Doucet

(10) Patent No.: US 11,344,038 B2
(45) Date of Patent: May 31, 2022

(54) CRAB MEAT REMOVAL DEVICE AND METHOD FOR REMOVING MEAT

(71) Applicant: Darren Doucet, Colorado Springs, CO (US)

(72) Inventor: Darren Doucet, Colorado Springs, CO (US)

(*) Notice: Subject to any disclaimer, the term of this patent is extended or adjusted under 35 U.S.C. 154(b) by 11 days.

(21) Appl. No.: 16/943,734

(22) Filed: Jul. 30, 2020

(65) Prior Publication Data

US 2022/0030893 A1 Feb. 3, 2022

(51) Int. Cl.
*A22C 29/00* (2006.01)
*A22C 29/02* (2006.01)
*A47G 21/06* (2006.01)

(52) U.S. Cl.
CPC ............ *A22C 29/027* (2013.01); *A47G 21/06* (2013.01)

(58) Field of Classification Search
CPC .............................. A22C 29/00; A22C 29/07
USPC ........................................ 452/1, 6, 102–105
See application file for complete search history.

(56) References Cited

U.S. PATENT DOCUMENTS

| | | | | |
|---|---|---|---|---|
| 4,048,696 A | * | 9/1977 | Maschio | A22C 29/024 452/5 |
| 4,200,961 A | * | 5/1980 | Mueller | A22C 29/024 30/120.1 |
| 4,569,103 A | * | 2/1986 | Taurinskas | A22C 29/024 452/6 |
| 7,014,551 B1 | * | 3/2006 | Poland | A22C 29/024 452/6 |
| 9,888,698 B1 | * | 2/2018 | Morsell | A47G 21/065 |
| 10,292,401 B2 | * | 5/2019 | Mobley | A22C 29/027 |
| 2010/0216379 A1 | * | 8/2010 | Little | A47G 21/061 452/6 |

* cited by examiner

*Primary Examiner* — Richard T Price, Jr.

(57) ABSTRACT

A crab meat removal device that is extremely easy and fast to remove crab meat and eliminates the need for traditional more tedious devices and methods associated with removing crab meat. The crab meat removal device includes a handle, an elongated stem, and a contact head. The contact head may be circular or oval and may push or pull the crab meat from the crab leg that accommodates the anatomy of the crab shell and tendons. The crab meat removal device may be made from stainless steel that is subjected to an electro phasing process to prevent corrosion and to meet Food and Drug Administration (FDA) rules and regulations. The crab meat removal device also includes a corresponding method for removing crab meat.

11 Claims, 5 Drawing Sheets

CRAB MEAT REMOVAL DEVICE AND METHOD FOR REMOVING MEAT

This application claims priority to U.S. Provisional Application No. 62/921,638 filed on Jun. 27, 2019, the entire disclosure of which is incorporated by reference.

BACKGROUND OF THE INVENTION

Field of the Invention

The present invention is a crab meat removal device. More specifically, the present invention is a crab meat removal device and method for removing crab meat.

Description of the Related Art

Removal of crab meat has always been a tedious task. Snow crab or King crab has a particularly tasty type of crab meat and is a popular food that is always in great demand.

What is needed is a crab meat removal device and method for removing crab meat that is extremely easy and fast to remove crab meat and eliminates the need for traditional more tedious devices and methods associated with removing crab meat.

BRIEF SUMMARY OF THE INVENTION

The present invention is a crab meat removal device. More specifically, the present invention is a crab meat removal device and method for removing crab meat.

The crab meat removal device includes a skewed handle facilitating a user's grip to provide more leverage to remove a plurality of crab meat from a crab leg, an elongated stem extending from the handle and a contact head extending from the elongated stem making direct contact with the crab meat from the crab leg.

A corresponding method for removing crab meat includes the steps of breaking off each end of a crab leg, grasping a crab meat removal device, inserting the crab meat removal device into the crab leg, performing a specific motion to extract the crab meat within the crab leg, and gathering the extracted crab meat within the crab leg for a desired use.

It is an object of the present invention to provide a crab meat removal device and method for removing crab meat that is relatively easier than traditional crab meat removal devices and methods.

It is an object of the present invention to provide a crab meat removal device and method for removing crab meat that is relatively safer than traditional crab meat removal devices and methods.

It is an object of the present invention to provide a crab meat removal device and method for removing crab meat that is relatively much faster than traditional crab meat removal devices and methods.

It is an object of the present invention to provide a crab meat removal device and method for removing crab meat that complies with all FDA rules and regulations.

It is an object of the present invention to provide a crab meat removal device and method for removing crab meat that is made of stainless steel that is subjected to an electro phasing process to prevent corrosion.

It is an object of the present invention to provide a crab meat removal device and method for removing crab meat that includes a circular contact head and an oval contact head of a crab meat removal device to accommodate the anatomy of the crab shell and tendons.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
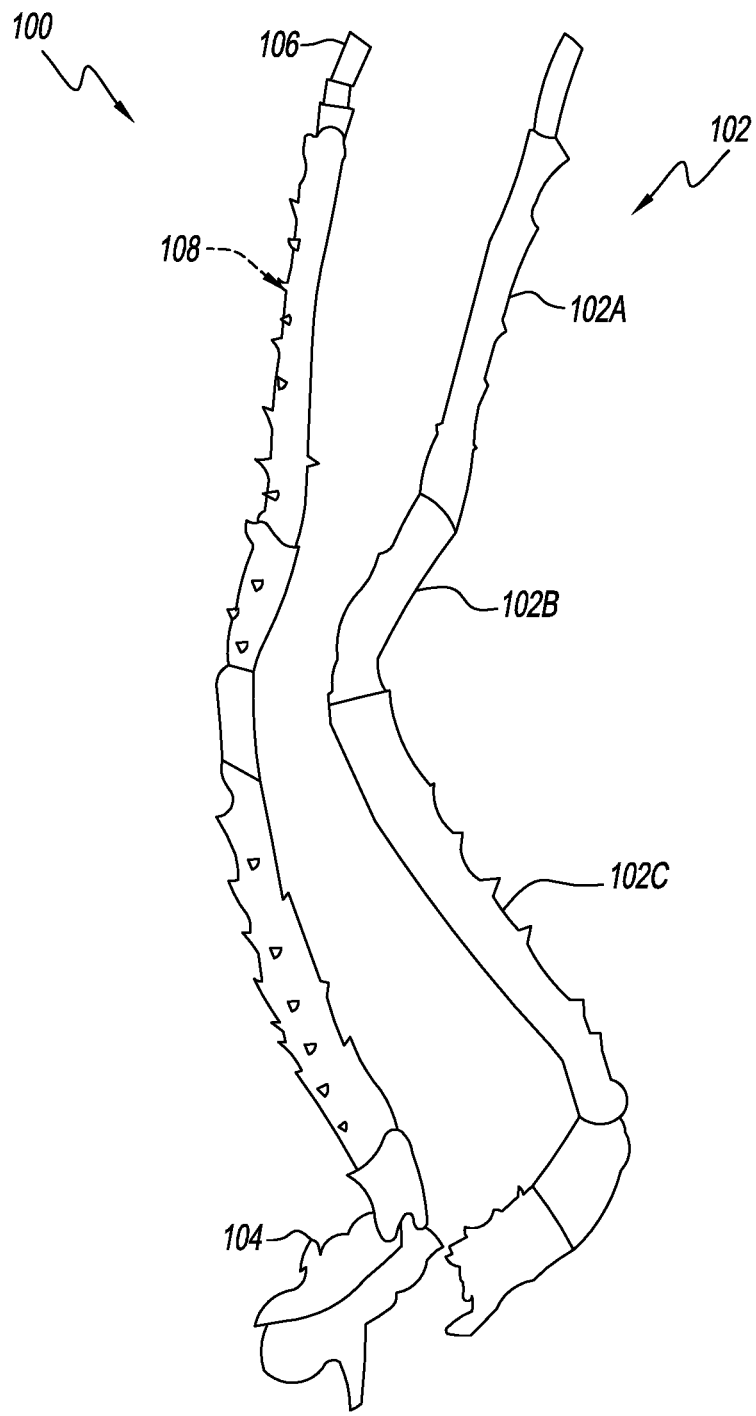
FIG. 1 illustrates an overhead perspective view of a pair of crab legs, in accordance with one embodiment of the present invention.

FIG. 1 illustrates an overhead perspective view of a pair of crab legs 100, in accordance with one embodiment of the present invention.

The pair of crab legs 100 each include a plurality of segments 102, a first end 104, and a second end 106.

More specifically, the segments 102 include a first segment 102A, a second segment 102B, and a third segment 102C. The first end 104 may be broken off manually or the like to access a plurality of crab meat 108 within one of the pair of crab legs 100. The second end 106 may be broken off manually or the like to access the crab meat 108 within one of the pair of crab legs 100.

Figure 2:
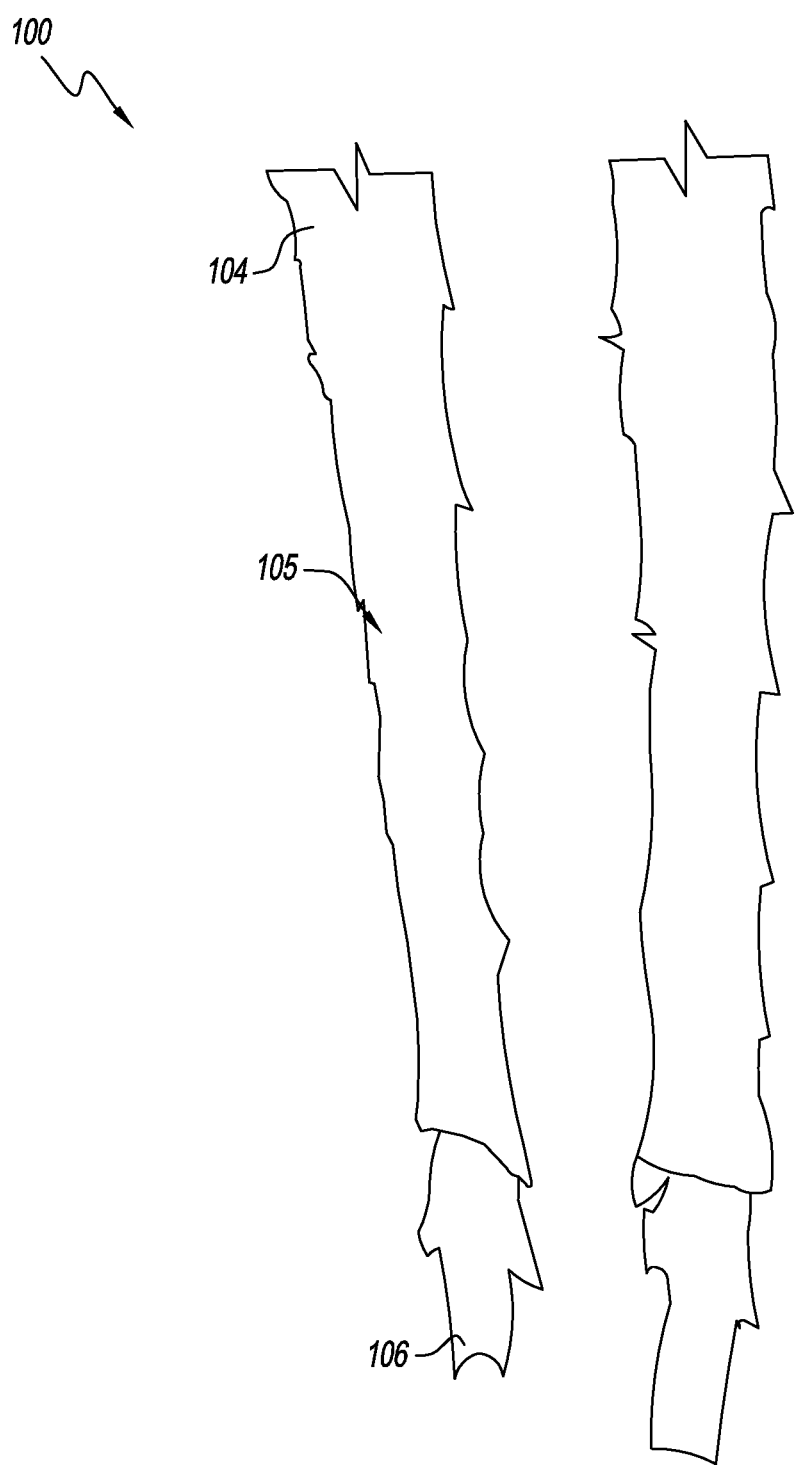
FIG. 2 illustrates an overhead perspective view of a pair of opened crab legs, in accordance with one embodiment of the present invention.

FIG. 2 illustrates an overhead perspective view of a pair of opened crab legs 100, in accordance with one embodiment of the present invention. More specifically, the pair of opened crab legs 100 illustrate an open top 105 without the crab meat (FIG. 1, 108).

The crab meat removal device (FIG. 3, 110) may be inserted into the first end 104 or the second end 106 of one of the pair of crab legs 100 to push the crab meat 108 within one of the pair of crab legs 100 outside of the one of the pair of crab legs 100 or the like. More specifically, the crab meat removal device 110 may be inserted into one end and slide along the length of the crab meat removal device 110 to push the crab meat 108 through an opposite end of the crab meat removal device 110.

Figure 3:
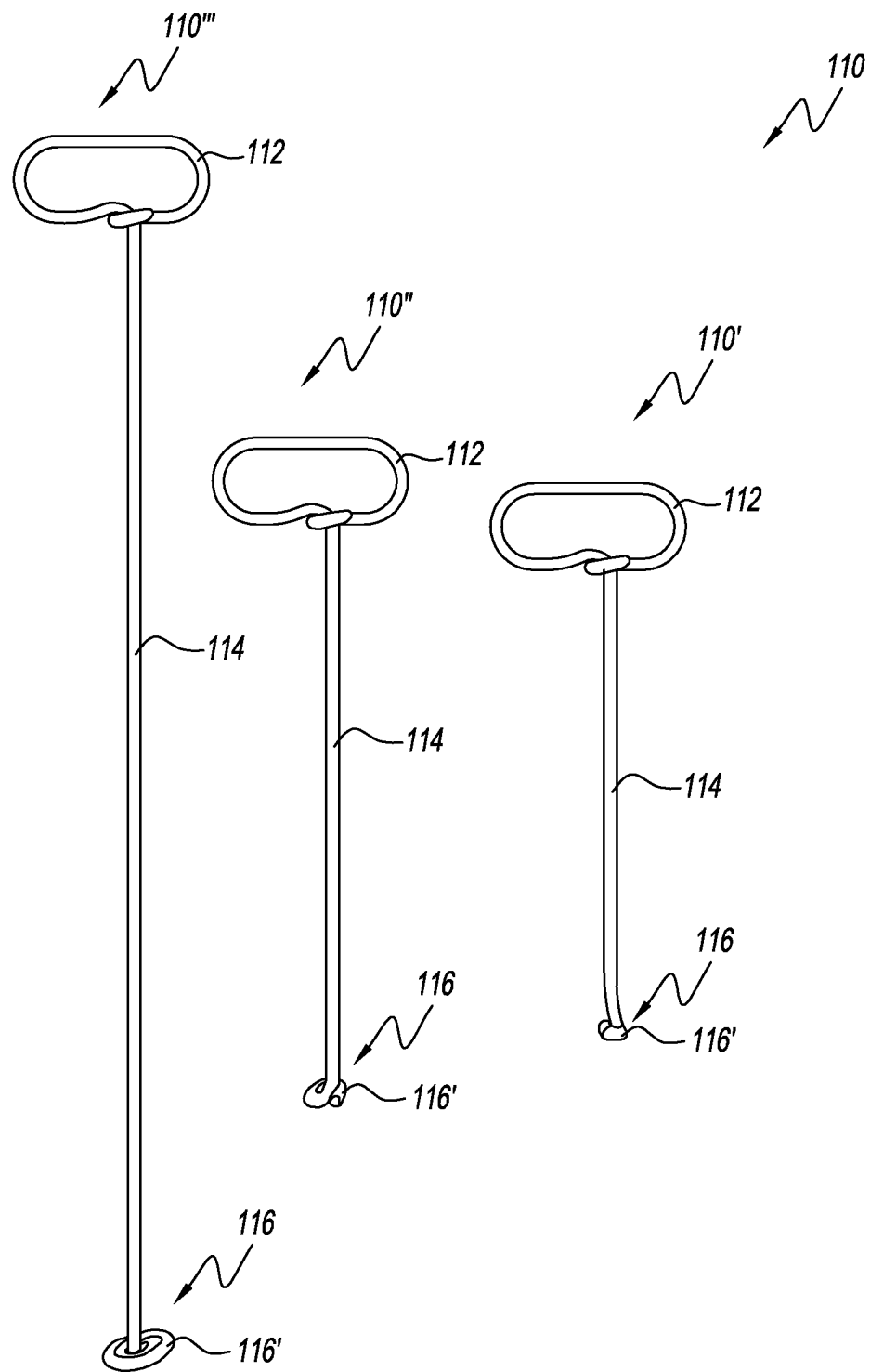
FIG. 3 illustrates an overhead perspective view of a pair of crab meat removal devices, in accordance with one embodiment of the present invention.

FIG. 3 illustrates an overhead perspective view of three crab meat removal devices 110, in accordance with one embodiment of the present invention.

The three crab meat removal devices 110 may include a first crab meat removal device 110', a second crab meat removal device 110", and a third crab meat removal device 110'".

The first crab meat removal device 110' may be used to remove crab meat from a relatively smaller crab than the crab meat from the second crab meat device 110", which is used to remove crab meat from a relatively smaller crab than the crab meat from the third crab meat device 110'". The three crab meat removal devices 110 may each include a handle 112, an elongated stem 114, and a contact head 116.

The handle 112 may be skewed to facilitate a user's grip and provide relatively more leverage to remove the crab meat 108 from the one of the pair of crab legs 100 or the like. The elongated stem 114 may extend from the handle 112. The contact head 116 may extend from the elongated stem 114 making direct contact with the crab meat 108. The contact head 116 may have a circular shape 116A, an oval shape 116B or the like that accommodates the anatomy of the crab shell and tendons.

The three crab meat removal devices 110 may each be a single wire that is shaped into the handle 112, the elongated stem 114, and the contact head 116. The three crab meat removal devices 110 may be made of stainless steel that is subjected to an electro phasing process to prevent corrosion and to meet Food and Drug Administration (FDA) rules and regulations. More specifically, the stainless steel may be Code 304 with an electro phasing finish or the like.

Figure 4:
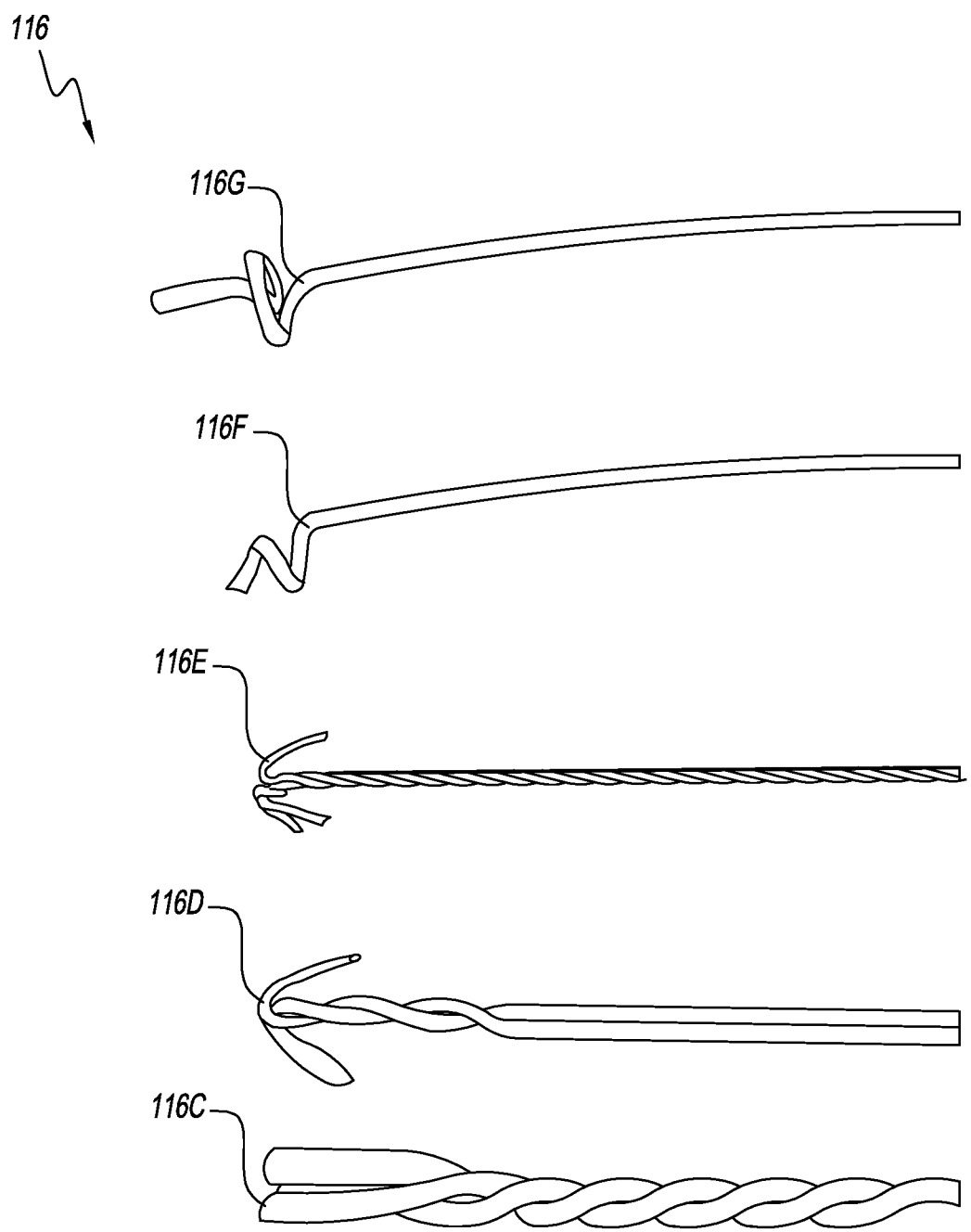
FIG. 4 illustrates an overhead perspective view of a plurality of contact heads of a crab meat removal device, in accordance with one embodiment of the present invention.

FIG. 4 illustrates an overhead perspective view of a plurality of contact heads 116 of a crab meat removal device (FIG. 3, 110), in accordance with one embodiment of the present invention.

The contact heads 116 of a crab meat removal device 110 may include a 3-prong fork 116C, a 2-prong anchor 116D, a 3-prong anchor 116E, a corkscrew 116F, and a circle pick 116G.

The 3-prong fork 116C may be pushed through one of the pair of crab legs 100 to push the crab meat 108 through one of the pair of crab legs 100. The 2-prong anchor 116D may be pulled through one of the pair of crab legs 100 to pull the crab meat 108 through one of the pair of crab legs 100. The 3-prong anchor 116E may be pulled through one of the pair of crab legs 100 to pull the crab meat 108 through one of the pair of crab legs 100. The corkscrew 116F may be pushed through one of the pair of crab legs 100 to push the crab meat 108 through one of the pair of crab legs 100. The circle pick 116G may be pushed through one of the pair of crab legs 100 to push the crab meat 108 through one of the pair of crab legs 100.

Figure 5:
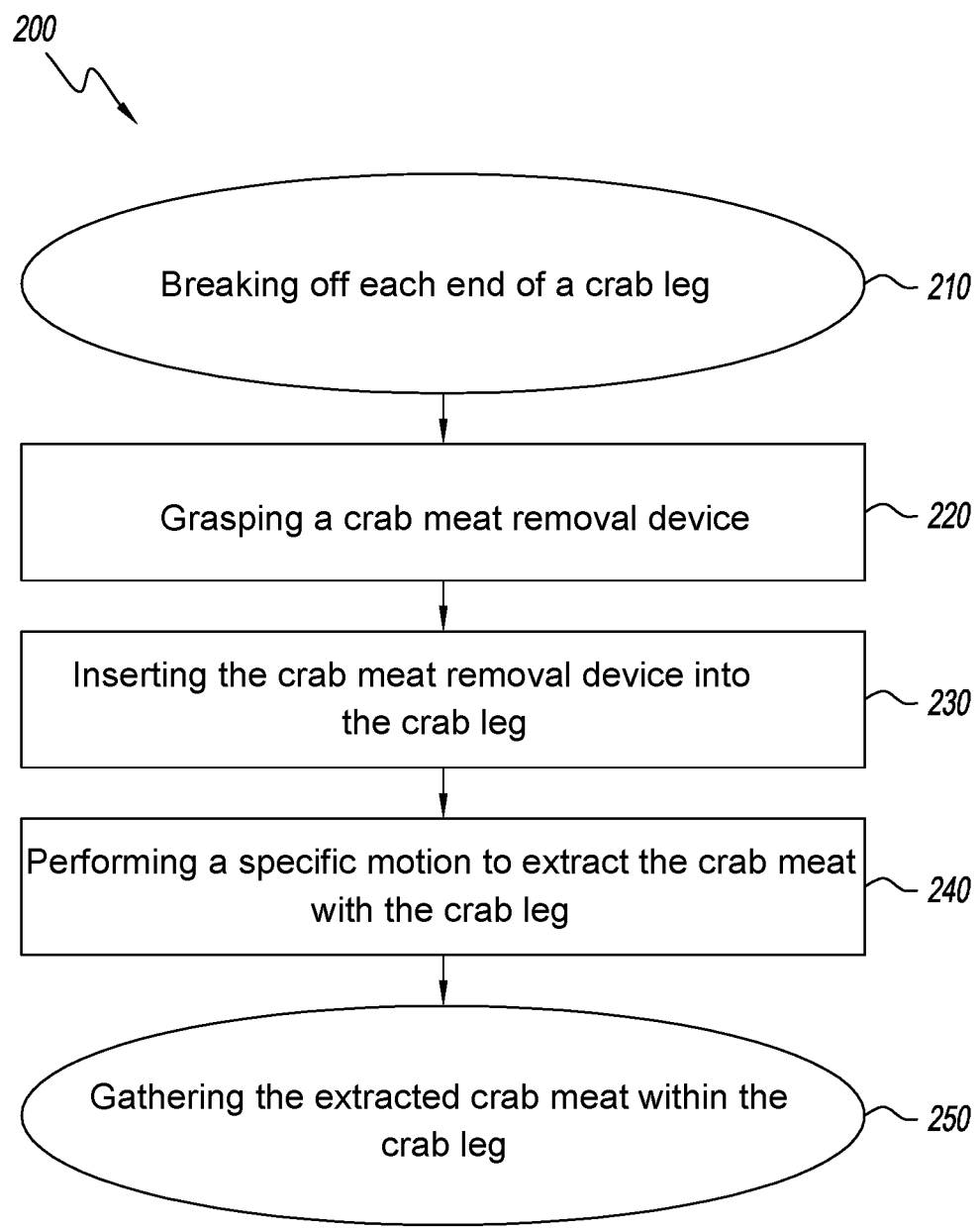
FIG. 5 illustrates a flowchart of a method for removing crab meat, in accordance with one embodiment of the present invention.

FIG. 5 illustrates a flowchart of a method for removing crab meat 200, in accordance with one embodiment of the present invention.

The method for removing crab meat 200 may include the steps of breaking off each end of a crab leg 210, grasping a crab meat removal device 220, inserting the crab meat removal device into the crab leg 230, performing a specific motion to extract the crab meat within the crab leg 240, and gathering the extracted crab meat within the crab leg 250.

The breaking step 210 may include each end of a section of the crab leg is broken off. The grasping step 220 may include the crab meat removal device having a handle, an elongated stem, and a contact head. The inserting step 230 may be inserted into a first end or a second end of the broken off crab leg. The inserting step 230 may include the contact head having a circular contact head, an oval head, or the like. The performing step 240 may include a pushing motion, a pulling motion, or the like to extract the crab meat within the crab leg. The gathering step 250 may include the crab leg is from a crab type selected from the group consisting of a crab, a super colossal crab, a giant red king crab, or a snow crab.

The conception of the crab meat removal device and method for removing crab meat started with the idea there has to be a way to effectively remove crab meat from the shell. There were many other hypothesized product designs, but merely after pondering their potential they were not found viable. Each of the product designs presented do work with some degree of effectiveness, but step-by-step each design was improved, which gave new insight.

The first design was a block of wood with a slat cut through it so a knife could be quickly pulled to cut the crab shell in half. It was an exciting discovery, but it was too dangerous, where some people could cut themselves. Hence, a box was created so that the knife was not exposed (to prevent injury or harm). The product worked even better, but there was still concerns about the safety aspect and the cost effectiveness to manufacturing. Hence, an additional design was created which had two pointed razor blades where the handle could be squeezed to penetrate the crab shell and then be pulled to cut the shell in half. However, this design was too dangerous.

It was then hypothesized the potential of a pull method or a push method through the inside of the crab shell. In order to perform such testing, the three main segments of the crab leg were broken apart and different geometric shaped contact heads were considered. All of these designs had some effective results and did actually work to some degree.

It was also discovered that sometimes the various product designs didn't work some of the time. The one way this could be figured out was to study the anatomy of the crab shell. The crab shell was dissected and tendons and other physical components were found as well. It was discovered that the tendons pointed in one direction and there was very little resistance and conversely high resistance in the other direction.

It was considered adding a sharp edge to the overall device where the tendon could be cut in half but there were concerns about dangerous attributes while trying to keep a safe product. The anatomy of the crab shell was studied further and it was realized that there was a matching feature on the outside of the crab shell which gave the user a clue as to which direction to use the overall device. Yes, a user could simply try both directions, but why do that, if one direction was best and given as an instruction to the user.

In light of this understanding it was possible to further test the effectiveness of each of the designs of the contact heads. In addition, it was possible to start to study the varying geometric dimensions of the crab legs and realize that an oblong shape would be the most effective when inserted through the orifice and pushed forward. Certainly, it was possible to create a set of many geometric shapes, but currently it was decided that a set of 3 geometric shapes should be sufficient to effectively remove crab meat from shells and be economically provided to the user.

In order to comply with the FDA requirements for kitchen/food product utensils, it was decided to use stainless steel, Code 304 with an electro phasing finish. The stainless steel has sufficient tensile strength for performing the function of inserting into the crab shell and overcoming the resistance force by the crab meat inside the shell.

Although an approved FDA plastic could potentially be used for this product, it was impossible to use such material, because its design would have required a plastic injection molding, which would cost tens of thousands of dollars for each design and would not be cost effective. Thusly, steel has been used and will continue to be used in this initial manufacturer. Obviously, a harden plastic will be considered in a subsequent manufacturing process in order to reduce the cost of goods sold for the product.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A crab meat removal device, comprising:
    a skewed handle adapted to facilitate a user's grip to provide more leverage adapted to remove a plurality of crab meat from a crab leg;
    an elongated stem extending from the handle;
    a contact head extending from the elongated stem adapted to making direct contact with the crab meat from the crab leg; and
    a single wire that is shaped into the handle, the elongated stem, and the contact head.

2. The crab meat removal device according to claim 1, wherein the contact head has a circular shape.

3. The crab meat removal device according to claim 1, wherein the contact head has an oval shape.

4. The crab meat removal device according to claim 1, wherein the contact head is pulled through the crab leg to pull the crab meat through the crab leg.

5. The crab meat removal device according to claim 4, wherein a 2-prong anchor contact head is pulled through the crab leg to pull the crab meat through the crab leg.

6. The crab meat removal device according to claim 4, wherein a 3-prong anchor contact head is pulled through the crab leg to pull the crab meat through the crab leg.

7. The crab meat removal device according to claim 1, wherein the contact head is pushed through the crab leg to push the crab meat through the crab leg.

8. The crab meat removal device according to claim 7, wherein the contact head pushed through the crab leg to push the crab meat through the crab leg is selected from the group consisting of a 3-prong Cork, a corkscrew, or a circle pick.

9. The crab meat removal device according to claim 1, wherein the crab meat removal device is made of stainless steel.

10. The crab meat removal device according to claim 9, wherein the stainless steel is Code 304.

11. The crab meat removal device according to claim 9, wherein the stainless steel has an electro phasing finish.

* * * * *